United States Patent [19]

Kersting

[11] Patent Number: 4,798,750
[45] Date of Patent: Jan. 17, 1989

[54] RETORTABLE CONTAINERS WITH EXTERIOR MODIFIED POLYSTYRENE CAP LAYER

[75] Inventor: R. James Kersting, Houston, Tex.

[73] Assignee: Rampart Packaging Inc., Williamsburg, Va.

[21] Appl. No.: 113,958

[22] Filed: Oct. 29, 1987

[51] Int. Cl.$^4$ .................. B65D 23/00; B37B 27/08
[52] U.S. Cl. .................................. 428/36.7; 428/516; 428/515
[58] Field of Search .................. 428/35, 515, 516, 520

[56] References Cited

U.S. PATENT DOCUMENTS

| | | | |
|---|---|---|---|
| 3,995,763 | 12/1976 | Ayres et al. | 428/516 |
| 4,440,824 | 4/1984 | Bonis | 428/516 |
| 4,472,485 | 9/1984 | Tabuse et al. | 428/516 |
| 4,513,037 | 4/1985 | Collins | 428/35 |
| 4,608,311 | 8/1986 | Giles, Jr. et al. | 428/412 |
| 4,650,721 | 3/1987 | Ashcraft et al. | 428/516 |

Primary Examiner—George F. Lesmes
Assistant Examiner—James J. Seidleck
Attorney, Agent, or Firm—Donald F. Haas

[57] ABSTRACT

A multilayer structure and container formed therefrom is disclosed which comprises a layer of a polystyrene polymer modified with a carboxylic acid or carboxylic anhydride and a layer of an ethylene vinyl alcohol copolymer.

6 Claims, No Drawings

RETORTABLE CONTAINERS WITH EXTERIOR MODIFIED POLYSTYRENE CAP LAYER

BACKGROUND OF THE INVENTION

Thermoplastic materials are rapidly replacing glass and metal as the material of choice in many food packaging applications and many other applications which require a package or container which is highly impermeable to oxygen and other gases. Ethylene vinyl alcohol copolymers are known to be highly impermeable to such gases as long as the water content of the copolymers is relatively low. Ethylene vinyl alcohol copolymers (EVOH) are commonly used in packaging applications with polyolefins. The purpose of the polyolefins is to provide structural stability and also to prevent the passage of moisture into the EVOH, thus helping to maintain the oxygen barrier properties of the EVOH. Methods of making such containers include forming them from a sheet and injection blow molding. The sheet from which the container is formed must have a multilayer structure which provides a continuous oxygen barrier layer.

In order that they be able to achieve significant market acceptability, such packages or containers must be able to withstand heating without significant distortion. The ability to "hotfill" packages or to retort foods after they have been packaged permits the foods to be stored without refrigeration. Commercial sterilization by hot-filling or retorting imposes several additional restrictions on the choice of materials for the package: (1) the heat seal must survive commercial sterilization temperatures of over 180° F. or typical retort conditions of steam or water at 250° F. or more under pressure for one half hour or more; (2) the structure must not delaminate, unduly shrink or wrinkle as a result of the sterilization; (3) the oxygen and water barrier properties must not be permanently adversely affected by the conditions of commercial sterilization; and (4) the structure must be adequately strong to permit the handling of the package while still hot. The need for these additional hot filling or retorting requirements rules out many of the materials and structures commonly used for non-retorted film or sheet food packages.

Plastic food containers containing EVOH which are subjected to a steam retort process for food preservation will lose their oxygen barrier properties. This occurs because the polyolefins allow the passage of a great deal of moisture therethrough at the high temperatures of the retort process and the EVOH becomes saturated with water vapor and suffers a significant decrease in its oxygen barrier properties. As the EVOH later dries out over a period of days, the oxygen barrier is reestablished. However, because polyolefins are highly impermeable to moisture at normal temperatures, the drying out process takes a long time because a significant amount of water remains trapped within the EVOH layer. It is highly desirable to accelerate the removal of moisture from the EVOH to preserve the foods stored therein.

SUMMARY OF THE INVENTION

This invention relates to a multilayer structure and a container formed from such a structure such that the container may be subjected to retort conditions and the oxygen barrier properties thereof will be rapidly reestablished subsequent to the retort process. The multilayer structure comprises a layer of a polystyrene polymer modified with a carboxylic acid or a carboxylic anhydride and a layer of an ethylene vinyl alcohol copolymer (EVOH). The container of the present invention is formed from the aforementioned multilayer structure. The preferred modified polystyrene polymer is a styrene-maleic anhydride statistical copolymer.

DETAILED DESCRIPTION OF THE INVENTION

Ethylene vinyl alcohol copolymers are well known for their ability to prevent the passage of oxygen therethrough. Such copolymers have been used for a number of years for food and other packaging applications which require that oxygen be prevented from coming into contact with the contents of the package. Such copolymers are sold by Kuraray under the trademark EVAL ® and also by other companies.

The modified polystyrene polymers are modified with unsaturated carboxylic acids or carboxylic anhydrides. The modified polystyrene should contain an unsaturated carboxylic anhydride or acid, preferably in an amount from about 6 to about 16% by weight in order for the polymer to have a sufficiently high heat distortion temperature to enable it to survive a typical retort process. The higher percentage of anhydride is preferred to increase heat resistance and increase adhesion to the barrier EVOH. The carboxylic acids and anhydrides include acrylic acid, methacrylic acid, maleic acid, fumaric acid, itaconic acid, and anhydrides thereof. It is especially preferable to use maleic anhydride because of its availability and because of the good results which are achieved when it is used. These modified polymers can be produced by polymerizing the unsaturated carboxylic acid or anhydride with styrene.

Styrene-maleic anhydride copolymers have a heat distortion temperature which is higher than that of polypropylene which is the most commonly used polyolefin in oxygen barrier food packaging applications. Also, such styrene-maleic anhydride copolymers have a much higher ability to pass moisture therethrough at normal temperatures than does polypropylene. Therefore, the styrene-maleic anhydride copolymers can survive the high temperatures of the retort process and still allow a much more rapid drying out of the EVOH layer within than is possible if the cap or outer layer is made of polypropylene or some other polyolefin.

A non-distorting retortable container must be formed with polypropylene nearly or completely in the melt phase. This causes the sheet to sag in the oven which can be a considerable problem during processing. Another advantage of styrene-maleic anhydride copolymers is that they have superior melt strength which effectively inhibits sheet sag at the melting temperature of polypropylene.

Furthermore, such copolymers are relatively low in cost and will exhibit good adhesion to EVOH, probably eliminating the need for an adhesive layer between the two materials as is usually necessary between a polypropylene cap layer and an EVOH barrier layer. It is theorized that the relatively high adhesion of such copolymers to EVOH is due to the presence of the —OH moieties of EVOH which exhibit strong hydrogen bonding to maleic anhydride. In addition, under the proper conditions of time and temperature, the anhydride groups should react with the —OH groups to form an ester which would provide a chemical bond to hold the two layers together.

EXAMPLE

A styrene-maleic anhydride copolymer (Dylark 332 made by Arco Chemical Company), having the characteristics of 1.4 Melt Index/Heat Distortion Temperature (264 psi; annealed)=249° F., was coextruded with an ethylene vinyl alcohol copolymer (EVAL ® E made by Kuraray), having the characteristics of 44% mole ethylene/Melt Index=5.5, into a three layer structure:

30 mils SMA/7 mils EVOH/30 mils SMA. The SMA was extruded at a temperature of about 420° F. and the EVOH was extruded at a temperature of about 400° F. The adhesion between the layers was significantly stronger than the adhesion of polypropylene to EVOH.

Several 4 oz. cups were formed from the three layer structure by heating the structure in an Illig lab former and then carrying out the forming operation in a typical solid phase pressure forming mode. The lab former radiant heater elements were set at 600° F. The heating time was varied to cover a range of sheet temperatures from 293° F. to 336° F. Good-looking cups were formed over this temperature range and the adhesion of the layers was maintained. Delamination did not occur until the cups were cut apart and flexed.

I claim:
1. A multilayer structure comprising:
   (a) inner and outer layers of a polystyrene polymer modified with a carboxylic acid or a carboxylic anhydride; and
   (b) an intermediate layer of an ethylene vinyl alcohol copolymer.
2. The structure of claim 1 wherein the polystyrene polymer is modified with maleic anhydride.
3. The structure of claim 2 wherein the polystyrene polymer contains from about 6% to about 16% by weight of maleic anhydride.
4. A container formed from a multilayer structure comprising:
   (a) inner and outer layers of a polystyrene polymer modified with a carboxylic acid or a carboxylic anhydride; and
   (b) an intermediate layer of an ethylene vinyl alcohol copolymer.
5. The container of claim 4 wherein the polystyrene polymer is modified with maleic anhydride.
6. The container of claim 5 wherein the polystyrene polymer contains from about 6% to about 16% by weight of maleic anhydride.

* * * * *